United States Patent [19]

Einkauf et al.

[11] Patent Number: 4,764,966

[45] Date of Patent: Aug. 16, 1988

[54] METHOD AND APPARATUS FOR VOICE DETECTION HAVING ADAPTIVE SENSITIVITY

[75] Inventors: Mark A. Einkauf; Lynn P. West, both of Austin, Tex.

[73] Assignee: International Business Machines Corporation, Armonk, N.Y.

[21] Appl. No.: 786,972

[22] Filed: Oct. 11, 1985

[51] Int. Cl.⁴ .............................................. G01L 5/00
[52] U.S. Cl. ...................................... 381/46; 379/351; 370/81
[58] Field of Search ................................. 381/29–53, 381/110; 379/351; 370/81

[56] References Cited

U.S. PATENT DOCUMENTS

| | | | |
|---|---|---|---|
| 4,001,505 | 1/1977 | Araseki et al. | 381/46 |
| 4,027,102 | 5/1977 | Ando et al. | 179/1 |
| 4,057,690 | 11/1977 | Vagliani et al. | 381/46 |
| 4,061,878 | 12/1977 | Adoul et al. | 179/1 |
| 4,281,218 | 7/1981 | Chuang et al. | 379/351 X |
| 4,314,100 | 2/1982 | Ruether et al. | 381/42 |
| 4,365,112 | 12/1982 | Ruether et al. | 381/46 |
| 4,426,730 | 1/1984 | Lajotte et al. | 381/46 |
| 4,443,857 | 4/1984 | Albarello | 364/513 |
| 4,484,344 | 11/1984 | Mai et al. | 381/46 |
| 4,552,996 | 11/1985 | de Bergh | 381/46 X |
| 4,625,083 | 11/1986 | Poikela | 381/46 X |
| 4,667,065 | 5/1987 | Bangerter | 381/46 X |
| 4,672,669 | 6/1987 | Des Blache et al. | 381/46 |

OTHER PUBLICATIONS

IBM TDB, vol. 24, No. 1B, pp. 803–804, Jun. 1981, "Detection of Telephone Line Control Signals" to T. M. Campbell.

IBM TDB, vol. 26, No. 8, pp. 4074–4075, Jan. 1984, "Tone Detection Circuit" to Y. Bonnet.

Primary Examiner—Patrick R. Salce
Assistant Examiner—Emanuel Todd Voeltz
Attorney, Agent, or Firm—J. F. Villella, Jr.; H. St. Julian

[57] ABSTRACT

This invention enables voice energy to be distinguished from energy due to other sources such as telephone call progress signals. A portion of the audio spectrum is divided into a high and into a low frequency band and the energy content of these bands is examined. The audio energy of a signal is passed through a set of filters and compared. A frequency boundary crossing of an input signal subsequent to filtering is used to signify the receipt of a voice signal. By operating in this manner, voice, whose predominant frequency switches in a random fashion from being greater than to less than a cutoff frequency, can be distinguished from other signals either below or above the cutoff frequencies of the filters. The detection of voice energy is not begun until a predetermined threshold of energy has been received for a specified period of time. This specified period of time need not be continuous after a ringback signal is received. Subsequent to the receipt of a ringback signal, the voice detection mechanism will proceed as long as the total time above the threshold exceeds the specified time.

7 Claims, 4 Drawing Sheets

METHOD AND APPARATUS FOR VOICE DETECTION HAVING ADAPTIVE SENSITIVITY

DESCRIPTION

1. Technical Field

The present invention relates to the detection of voice energy, and more particularly, to the distinguishing of voice energy from other energy sources on a telephone line such as telephone call progress signals.

2. Background Art

In the telephony environment, it is very important to be able to detect voice energy and to distinguish such voice energy from energy due to other sources such as telephone call progress signals. After a telephone call has been placed, means must be provided to signal the calling party that the called party has answered. In order to accomplish this, the voice energy of the called party must be distinguished from the energy of telephone ringback signals. Typically, the ringback and other call progress signals consist of tones composed of one or more frequencies. An additional problem is that often there is some energy due to line switching before a call is established. Therefore, it is necessary for the detection mechanism to be moderately insensitive to voice energy before a call is established and the first ringback is received. This insensitivity is required because the energy from the switching noises occupies the same energy spectrum as voice signals.

One method for distinguishing voice energy from other sources of energy such as telephone call progress signals involves setting a threshold value which recognizes energy signals only when they exceed such threshold value. The signals that exceed the threshold value are then characterized as voice signals. This method has a shortcoming in that the threshold should be set high to avoid false detection of noise signals while at the same time it should not be set too high to prevent chopping of a speech signal, thereby reducing its intelligibility. One approach for overcoming this problem is to modify the threshold level according to the mean power level for the person speaking. However this is done over a relatively long time period which does not allow the threshold level to be sufficiently reduced in a short enough time period in order to detect non-voiced beginnings of words.

A variation of the power level discrimination technique is disclosed in U.S. Pat. No. 4,027,102 wherein an attempt is made to discriminate voice from a pulsed tone signal. This patent discloses counting the number of cycles of any audio signal input to the discriminating mechanism employed. A predetermined threshold number is established for counting the number of cycles of the inputted audio signal. When the number of counted signals exceeds the threshold level during a given time period, then this is an indication that a voice signal is on the line.

Another method of detecting the presence of voice on a telephone line involves the evaluation of parameters describing passages of the voice signal through a zero level. This zero crossing technique relies more on the frequency characteristics of the incoming signal than on the power characteristics of the signal. An example of the use of such method is shown in U.S. Pat. No. 4,061,878, which provides for speech detection of PCM multiplexed voice channels. The parameters monitored during the receipt of an input signal include the amplitude of the signal, the zero crossing of the signal and the zero crossing of the derivative of the incoming signal. The detection of voice is based upon the computation of these parameters over a predetermined time period of consecutive PCM samples.

One approach which combines to some extent the characteristics of the above approach is found in the U.S. Pat. No. 4,426,730 which attempts to detect the presence of speech in a telephone signal. This method sets a threshold value which decreases as the number of passages through the zero level of the signal approaches a predetermined number per time period. The method then interprets a signal as speech if its mean power level exceeds the predetermined threshold which has been decreasing according to the number of passages through the zero level over this predetermined time period.

It would be most desirable to be able to detect voice energy and distinguish such energy from telephone call progress signals without becoming subject to noise detection. Along this line, it would be desirable to have a method for detecting voice energy which is relatively insensitive at times that voice is unlikely and noise signals are quite likely, and then becomes more sensitive when voice is likely and noise signals are unlikely.

DISCLOSURE OF THE INVENTION

Accordingly, it is an object of this invention to provide improved detection of voice energy.

It is another object of this invention to be able to distinguish voice energy from telephone call progress signals.

It is a further object of this invention to provide a method and apparatus for detecting voice energy with adaptive sensitivity to noise signals.

In accordance with these and other objects of the invention, a method and apparatus are provided for detecting voice energy in the presence of other signals such as telephone call progress signals. In order to detect voice energy reliably, the method and apparatus must be quite sensitive, however it cannot be so sensitive as to detect noise energy which occurs at a time that voice energy is not likely to be present. This invention provides adaptive sensitivity wherein the detection scheme is relatively insensitive at times that voice is unlikely and noise quite likely, and then becomes much more sensitive when voice signals are likely and noise signals are unlikely.

After a telephone call has been placed, the voice detection technique described herein enables the caller to be signaled that the called party has answered. In the preferred embodiment, the detection of voice energy is not begun until a predetermined threshold of energy has been exceeded for a specified period of time. This is done in order to substantially eliminate the possibility of falsely detecting noise signals, which can be predominant at this time, and mistaking such noise signals for voice energy. This specified period of time need not be continuous after a ringback signal is received. If, after a ringback is received, the energy received is above a predetermined threshold for a length of time less than the specified time, then drops below the threshold level and then increases again above the threshold level, the voice detection will proceed as long as the total time above the threshold level exceeds the predetermined specified time. By so doing, energy impulses from line switching will not be detected as voice. Additionally, short impulses due to voice energy will be detected after a ringback is received.

In accordance with this invention, a portion of the audio spectrum is divided into a high and a low frequency band and the energy content of these bands is examined. The input audio signal is low pass filtered with the signal output from the low pass filter, filtered to obtain a proportional energy level This energy level is compared to the energy level of the input audio signal to determine if the energy is predominantly high or low frequency, i.e., above or below the cutoff frequency of the low pass filter. By operating in this manner, voice energy, whose predominant frequencies switch in a random fashion from being greater than to less than a cutoff frequency, can be distinguished from other signals either below or above the cutoff frequency of the low pass filter.

BEST MODE FOR CARRYING OUT THE INVENTION

Figure 1:
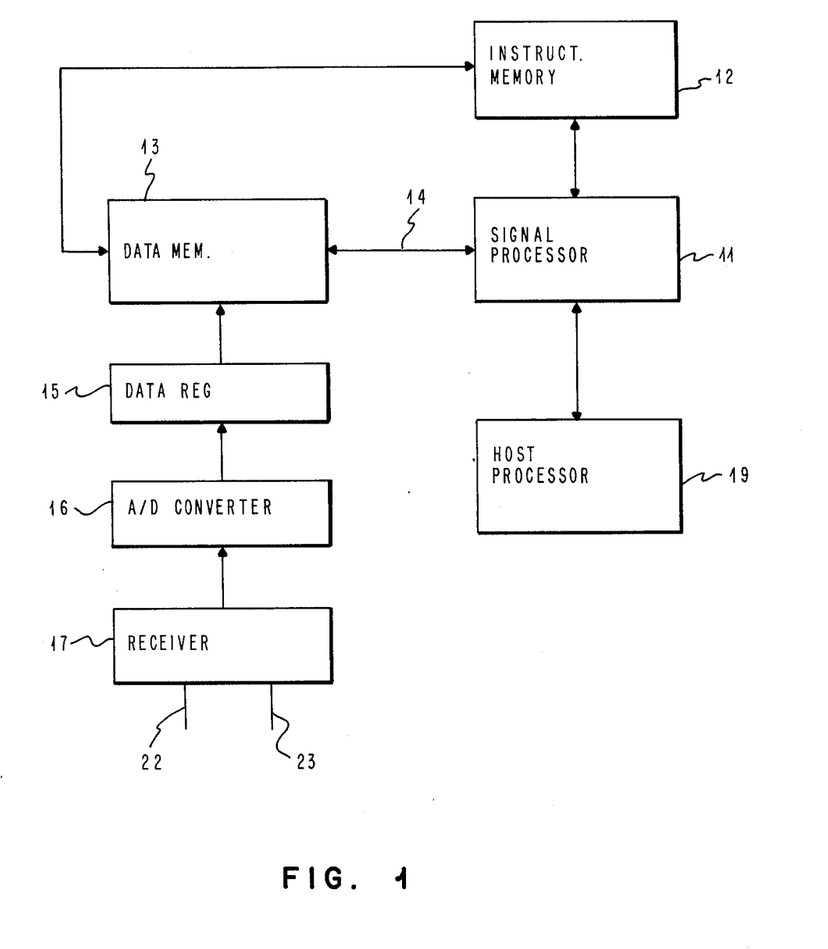
FIG. 1 is an overall functional block diagram of a system encompassing the voice detection techniques according to the present invention.

A simplified functional block diagram is shown in FIG. 1. Signal processor 11 may be any commercially available programmable signal processor such as the Texas Instruments TMS32010.

Signal processor 11 is totally controlled by host processor 19 and must have its central processing unit (CPU) instructions loaded before operation. Signal processor 11 uses instruction memory 12 as well as data memory 13. Both of these memories, i.e., instruction memory 12 and data memory 13 are accessible by host processor 19. However, instruction memory 12 is accessible by host processor 19 only when signal processor 11 is turned off, i.e., reset. At that time, host processor 19 can load from instruction memory 12 and then switch to data memory 13 which is shared at all times dynamically with signal processor 11. Both signal processor 11 and host processor 19 have the capability to interrupt one another with interrupt masking under control of host processor 19. Voice as well as telephone call progress signals are input over lines 22 and 23 to receiver 17. These incoming signals are converted to digital by A/D converter 16 and temporarily stored in data register 15. These digitized signals are then input to data memory 13. A/D converter 16 provides digitized samples of the signals input over lines 22 and 23. It is these digitized samples which are stored in data memory 13 and which are amplitude adjusted, thereby providing automatic gain control using signal processor 11. The automatic gain control mechanism used herein is described more fully in copending application, Ser. No. 06/786,911.

Figure 2:
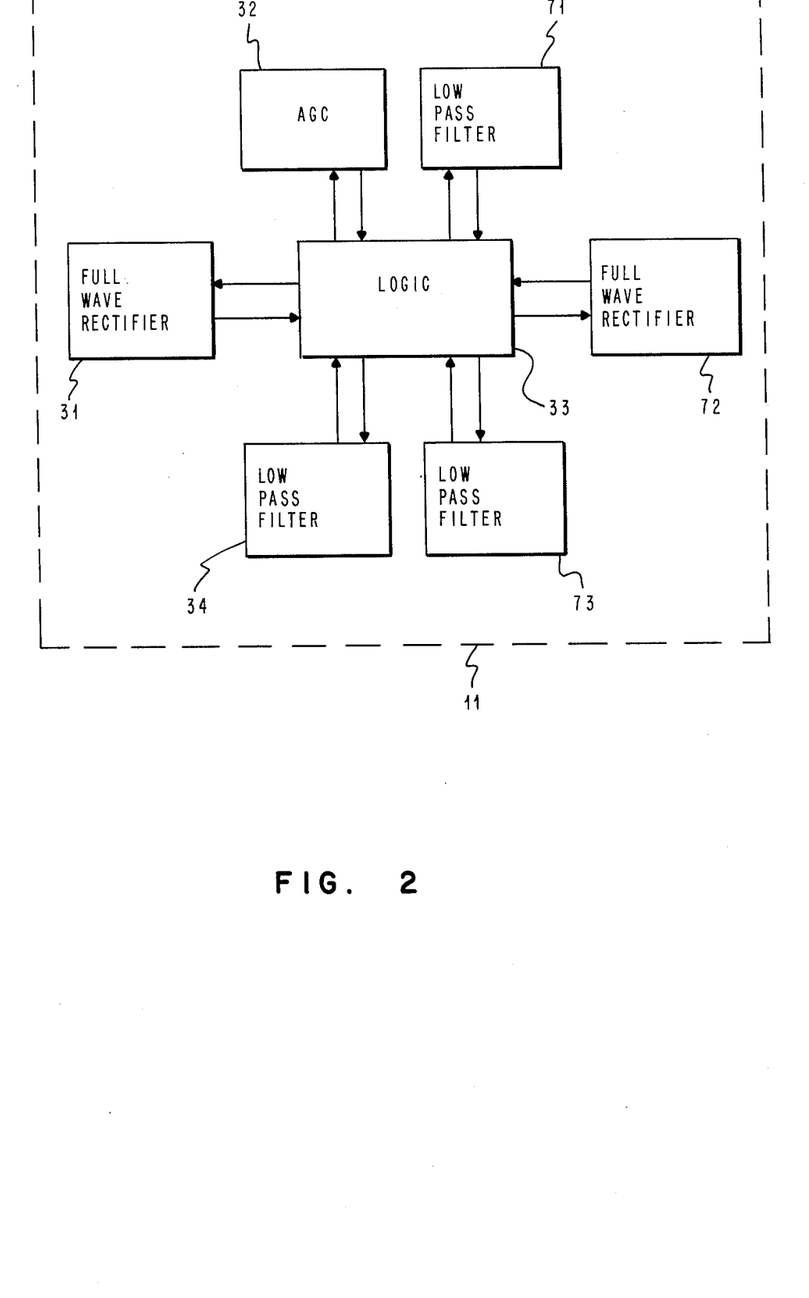
FIG. 2 is a simplified functional block diagram of the signal processor used in the present invention.

FIG. 2 shows in simplified functional block diagram form some of the additional functions performed by signal processor 11. Digitized input samples which are input to signal processor 11 are amplitude adjusted by automatic gain control (AGC) mechanism 32, low pass filtered by low pass filter 34, full wave rectified by full wave rectifier 31, and low pass filtered by low pass filter 71. The samples amplitude adjusted by AGC mechanism 32 are also operated on in a parallel path where they are full wave rectified by full wave rectifier 72 and low pass filtered by low pass filter 73. Full wave rectifier 31, AGC mechanism 32, low pass filter 71, full wave rectifier 72, low pass filter 73, and low pass filter 34, operate under control of logic 33.

The preferred embodiment of the present invention will now be described in more detail with reference to FIG. 3. When a digitized input sample is first received by signal processor 11, logic 33 sets a ringback flag (RB FLAG), a voice flag, a voice count, and an energy on-count (ON COUNT) all equal to an initial condition of zero. At this time, logic 33 also sets a voice count threshold equal to a high value and signifies that the voice detection mechanism is in state 1, the initial condition. The voice count is the number of times that a non-noise signal crosses a predetermined frequency boundary. In block 35, the digitized input sample is read into signal processor 11 from data memory 13. Prior to reading the input sample into signal processor 11, a timer is checked. This timer mechanism is included in order to discontinue processing by signal processor 11 if after a significant time has expired no valid signals, either voice or ringback, have been detected. In the preferred embodiment, two timeout values are used, one for silence and one for energy. When the voice detection mechanism begins, the silence timeout begins counting down until significant energy has been detected If the silence timeout expires prior to the detection of significant energy, then a status of no energy present is reported and the voice detection process terminates. If however, significant energy is detected before the silence timeout expires, then an energy timeout begins counting down. If the energy timeout expires before a valid signal is detected, then a status of unrecognizable energy is reported and the voice detection process terminates.

After the input sample is read it is then input to block 41 for automatic gain control. The automatic gain control amplifier output samples are then operated upon by low pass filter block 45. The in-band gain K2 of low pass filter block 45 is equal to unity and it has a cutoff frequency of 680 hertz. The output of block 45 is input to block 46, where the signal is full wave rectified and low pass filtered by a filter with cutoff frequency of 50 hertz, to obtain a DC energy level corresponding to the magnitude of the AC output of low pass filter block 45. The output of low pass filter block 46 is designated as the Y output and is input then to decision block 52 which determines whether or not Y is less than X. The X input to that block originates in the other branch following the automatic gain control. As can be seen after full wave rectification in block 42, the input signal is low pass filtered by low, pass filter block 43 which has a cutoff frequency equal to 50 hertz and a gain of K1. The output of low pass filter 43 is a DC energy level corresponding to the magnitude of the output of block 41. K1 is chosen so that the output of filter block 46 which has been designated a output Y is equal to the output of filter block 43, which is designated as output X, at a frequency of 680 hertz. Consequently, X is greater than Y for frequencies above 680 hertz and X is less than Y for frequencies below 680 hertz. 680 hertz is chosen as the boundary frequency since telephone call progress signals lie below 680 hertz and the average voice energy spectrum is centered about 680 hertz. In a system which is used to distinguish voice energy from signals other than telephone call progress signals, low pass filter 45 can be changed to have a cutoff frequency other than 680 hertz and, K1 and K2 may be set so that the boundary frequency is other than 680 hertz.

Output X is then sent to decision block 45 which determines whether or not the state is equal to 1, the initial condition. If the answer is no, then this is an indication that 53 milliseconds of energy have been received and that the detection mechanism has switched to state 2. At this point, the output samples are at block 47. If the X output level is not greater than the noise level, then a determination is made in block 48 as to whether or not the on-count value lies between 0.8 seconds and 2.5 seconds, i.e., has energy been received for this time period. If it does not lie within this range, then a check is made in block 49 for other call procress signals. Consequently, if the signal had not been on between 0.8 and 2.5 seconds then the signal is determined to be something other than ringback. In most cases, the signal will be either a busy or a fast busy signal. If the signal is not determined to be a call progress signal, the process continues at block 35. However, if the on-count value lies between 0.8 and 2.5 seconds, thereby indicating that the signal had been on between 0.8 and 2.5 seconds, then the signal is determined to be a detected ringback signal. At this time as shown in block 51, the ringback flag (RB Flag) is set to 1 and the voice flag (VFLAG), voice count (VCOUNT), and on-count, are all set equal to the initial condition of zero. The voice count (VCOUNT) threshold is then reduced to a low value and an indication is made that the state remains equal to 1. The voice count threshold is reduced here because after a ringback, the likelihood of noise is reduced while the likelihood of voice energy is increased. At this point, the voice detection mechanism proceeds to block 35 to read the next input sample.

On the other hand, if the X output level is determined to be greater than the noise level in block 47, then a determination is made in block 52 as to whether or not the X output is greater than the Y output. If the X output is greater than the Y output, then this is a determination that a predominantly high frequency signal has been received. Conversely if the X output is less than the Y output level, then this is an indication that a predominantly low frequency signal has been received. In the latter case, i.e., a low frequency signal, a determination is first made at block 53 as to whether or not the voice flag is equal to 1. If the answer is no, then as shown in block 54 the on-count value is incremented and the voice flag is set equal to zero. At this point, a check is made for whether or not a steady tone exists. If so, dial tone is detected and the voice detection process terminates. If not, the process continues at block 35. However, if the voice flag is equal to 1, then this is an indication that the predominant received energy has just changed from a high to a low frequency. The voice count is incremented and a determination is made at block 55 as to whether or not the voice count at that time is greater than the voice count threshold. If the answer is negative, then the on-count is incremented and the voice flag is set equal to zero and a check is made for whether or not a steady tone is being received. Once again if a steady tone is being received, a dial tone is reported and the voice detection process ends. However, if the answer is affirmative then a determination is made that a voice signal has been detected. At that point, the voice detection process terminates.

When the X output signal is greater than the Y output signal in block 52, thereby indicating that a high frequency signal has been received, then in block 61 the on-count value is set equal to zero and a determination is made as to whether or not the voice flag value is also equal to zero, i.e., was the energy received until this time predominantly low frequency. If the voice flag value is equal to 1, then the next input sample is read and the voice detection process continues. However, if the voice flag value is equal to zero, thereby indicating previous predominantly low frequency energy, then it is switched to a value of 1 and the voice count value is incremented. Also in block 63, a determination is made as to whether or not the voice count value is greater than the voice count threshold. If the voice count value is greater than the voice count threshold, then voice has been detected and the voice detection process terminates. However, if the voice count threshold is greater than the voice count, then voice has not been detected and the next input sample is read at block 35.

If at the time the X output is generated from low pass filter block 43, the state of the voice detection mechanism is equal to 1, then a determination is made in block 65 as to whether or not the X output level is greater than the noise level. If the noise level is greater, then a determination is made in block 68 as to whether or not the ringback flag is equal to 1 thereby indicating the receipt of a ringback signal. If the ringback flag is equal to zero, i.e., no ringback received yet, then the on-count value is set equal to zero and the next input sample is read. If however the ringback flag is equal to 1, then the next input sample is read. However, the on-count energy received value is not reset to zero.

However, if the X output level in block 65 is greater than the noise level, then the on-count is incremented and a determination is made as to whether or not the on-count value is creater than 53 milliseconds. If the on-count value is less than 53 milliseconds, then the next input sample is read. However, if the on-count value is greater than 53 milliseconds, then the voice detection mechanism is switched to state 2 and the next input sample is read.

The voice detection mechanism described above does not begin to execute until significant energy has been received for the time period of 53 milliseconds. Before a ringback is received, the inputted energy level must be above noise threshold continuously for the 53 millisecond time period. After a ringback however, the energy must be above the threshold for 53 milliseconds but the energy need not be above that level for a continuous 53 milliseconds. For example, after a ringback is received, if the energy is above the threshold for 20 milliseconds and then drops below the threshold for 1 second and then rises above the threshold for 33 milliseconds, then the voice detection proceeds (i.e., state changes from 1 to 2). Note, however, if this scenario had occurred before the first ringback then the voice detection would not proceed since the received energy level was not continuous for at least 53 milliseconds. This prevents noise energy impulses from line switching to cause the detection mechanism to initiate, while at the same time allowing short energy impulses due to voice signals to initiate the detection mechanism after a ringback is received.

Figure 3A:
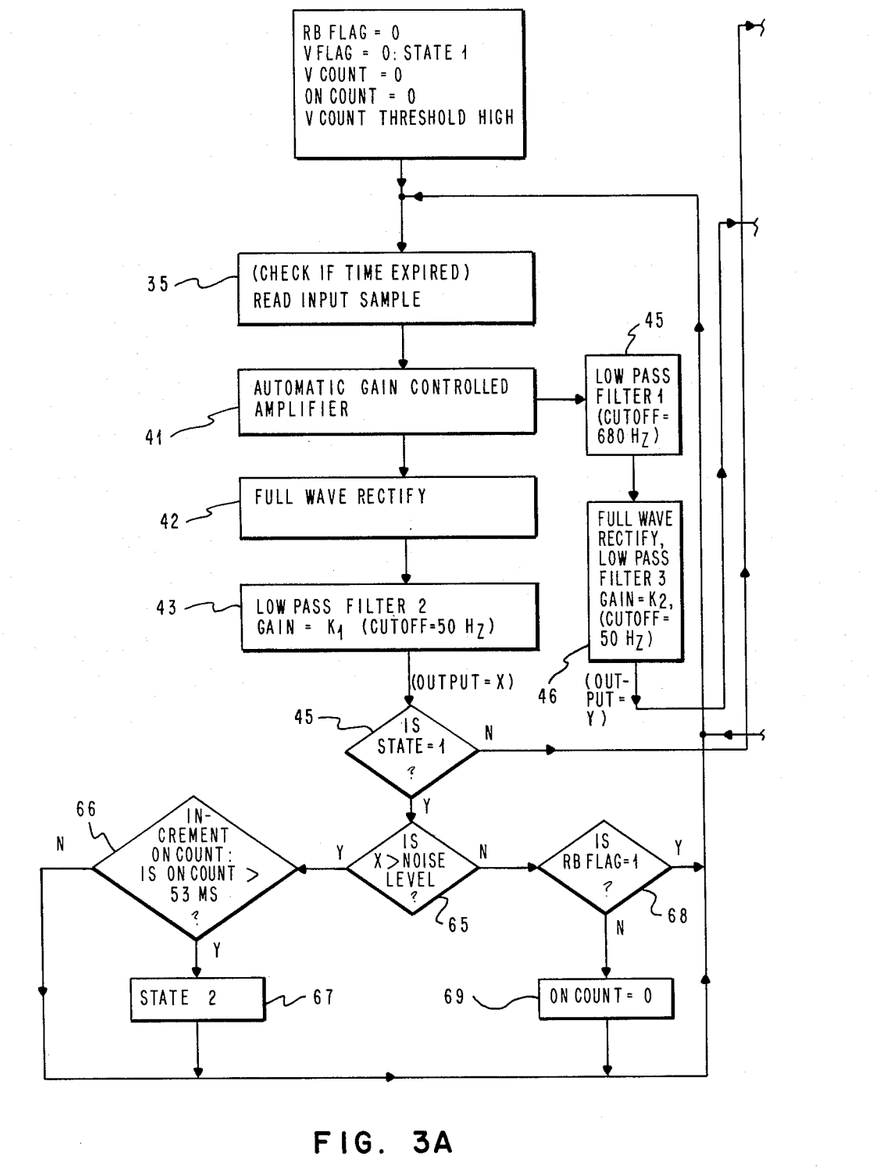
FIG. 3 is a flow chart depicting the operation of the preferred embodiment of the present invention.
Figure 3B:
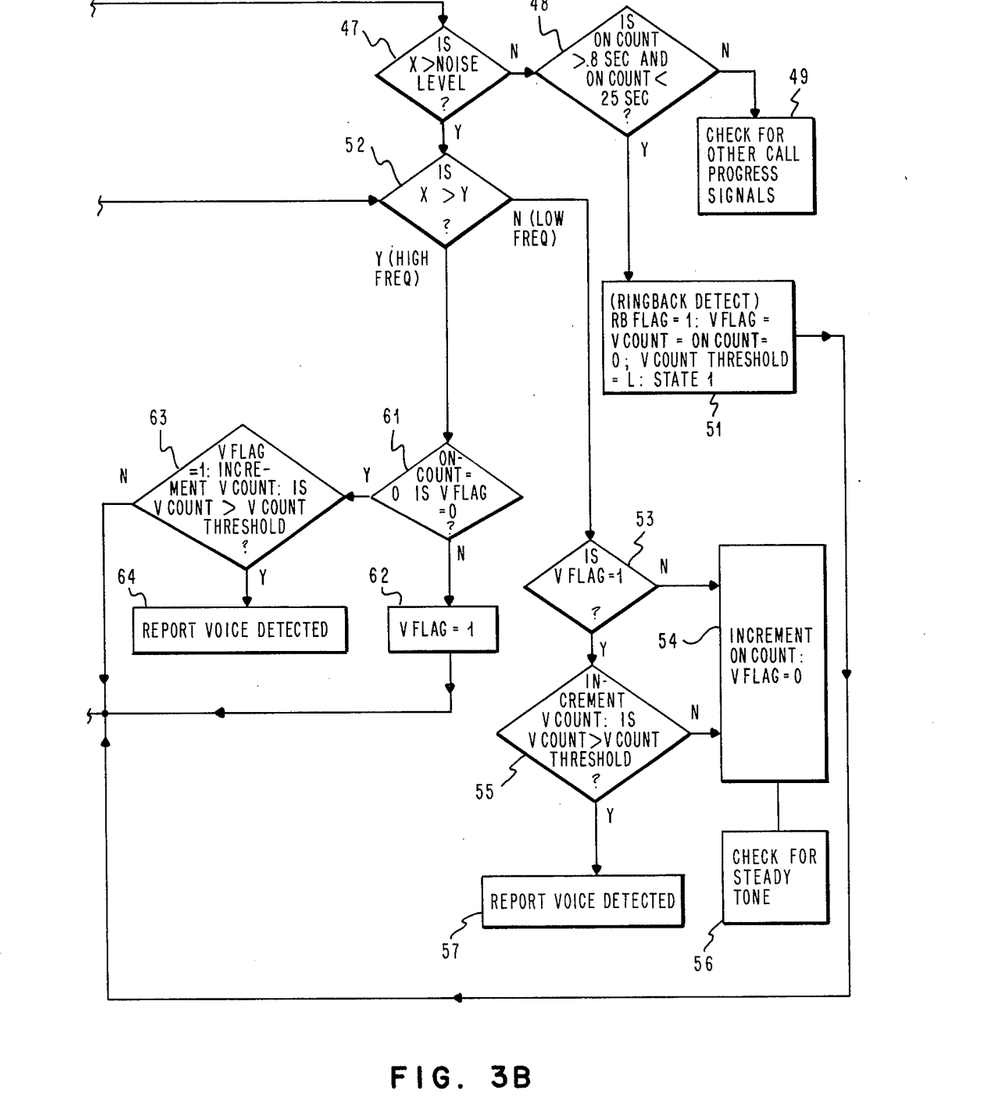
Figure 4:
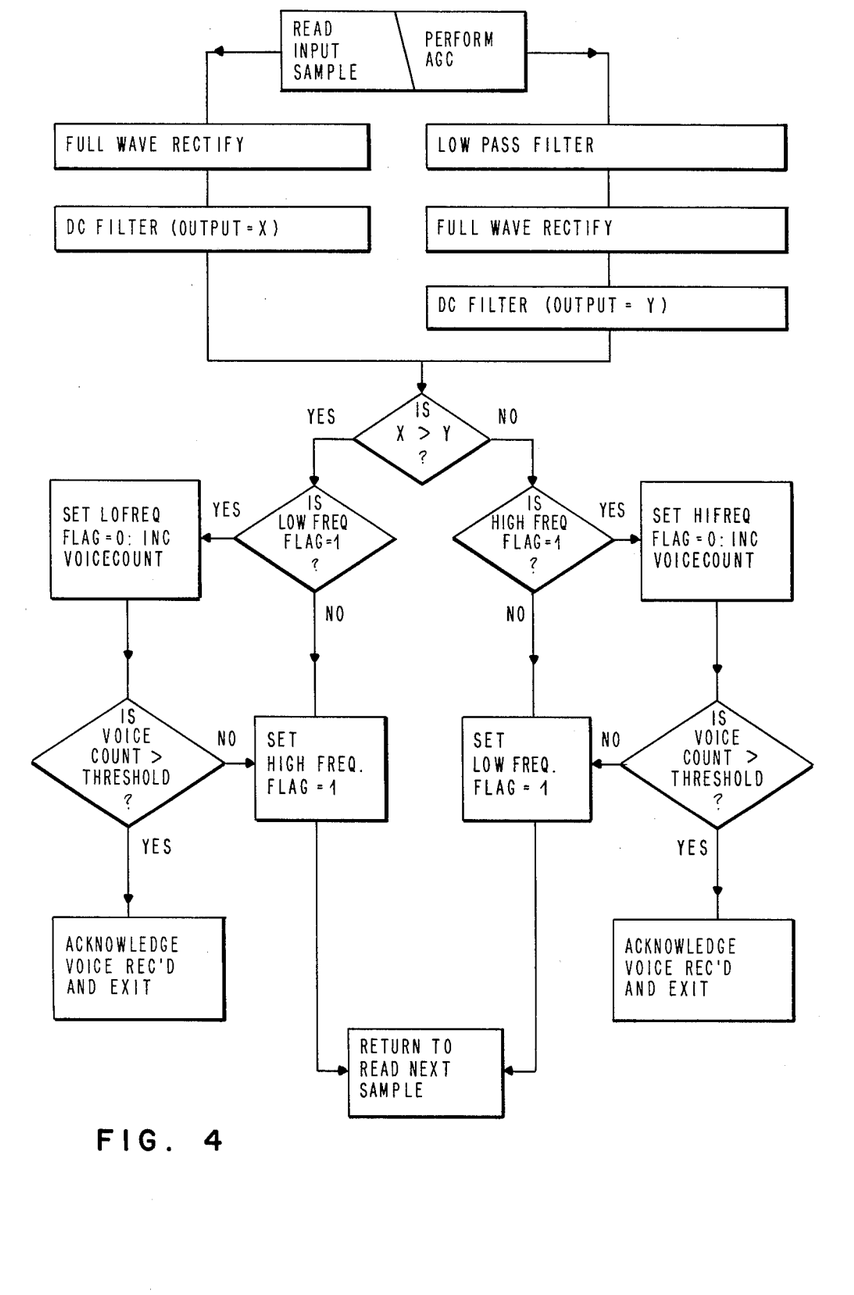
FIG. 4 is a flow chart depicting an alternative embodiment according to the present invention.

An alternative embodiment is shown in FIG. 4 wherein the adaptive sensitivite described hereinbefore with respect to FIG. 3 is absent. As can be seen in FIG. 4, after an input sample is read and input to the AGC amplifier, the signal is split and in one branch full wave rectified and then filtered with the output being referred to as the X output. In the other branch, the input signal is low pass filtered, rectified and then filtered once again with the output being designated as the Y output. At that time, a determination is made as to whether or not the X or the Y outputs are greater.

If the X output is greater than the Y output, then a determination is made as to whether or not the low frequency flag is equal to 1. If the low frequency flag is equal to zero, then the high frequency flag is set equal to 1 and the next input sample is read. However, if the low frecuency flag is equal to 1, then the low frequency flag is set equal to zero and the voice count is incremented. At that point, a determination is made as to whether or not the voice count exceeds the voice count threshold. If the answer is affirmative, then the receipt of a voice signal is acknowledged and the detection mechanism terminates. However, if the threshold remains greater than the voice count, then the high frecuency flag is set equal to 1 and the next input sample is read.

When the Y output is greater than the X output, then first a determination is made as to whether or not the high frequency flag is equal to 1. If it is not, then the low frequency flag is set equal to 1 and the next input sample is read. However, if the high frequency flag is equal to 1, then the high frequency flag is reset to zero and the voice count is incremented. At this point, a determination is made as to whether or not the voice count is greater than the threshold. If the answer is affirmative, then voice has been received and the detection process terminates. However, if the threshold value is greater than the voice count then the low frequency flag is set equal to 1 and the next input sample is read.

While the invention has been particularly shown and described with reference to a preferred embodiment therein, it will be understood by those skilled in the art that various other changes in form and detail may be made without departing from the spirit and scope of the invention.

What we claim is:

1. A method of detecting voice energy, comprising the steps of:

measuring a minimum energy level of an input signal for a predetermined time period in order to determine whether said input signal is a valid signal;

detecting in response to said input signal being a valid signal when the frequency of said input signal crosses a predetermined frequency boundary subsequent to the expiration of said predetermined time period; and characterizing said input signal as voice responsive to said detecting step subsequent to the number of frequency crossings exceeding a predetermined threshold value.

2. A method of detecting voice energy, comprising the steps of:

measuring a minimum energy level of an input signal for a predetermined time period in order to determine whether said input signal is a valid signal;

passing said valid input signal through a filter having a cutoff frequency;

detecting when the frequency of said valid input signal crosses a predetermined frequency boundary, corresponding to the cutoff frequency of said filter, subsequent to the expiration of said predetermined time period; and, characterizing said input as signal voice responsive to said detecting step subsequent to the number of frequency crossings exceeding a predetermined threshold value.

3. A system for detecting voice energy and for distinguishing said voice energy from voice and telephone ringback signals, comprising:

means for measuring a minimum energy level of an input signal for a predetermined time period in order to determine whether said input signal is a valid signal;

means responsive to said measuring means for detecting a requency crossing of said valid input signal over a predetermined frequency boundary subsequent to the expiration of said predetermined time period; and, means for detecting when the number of frequency crossing exceeds a predetermined threshold value, thereby characterizing said valid input signal as voice.

4. A system according to claim 3 further comprising means for filtering said input signal, said means having a filter with a cutoff frequency, said cutoff frequency forming said predetermined frequency boundary.

5. A system according to claim 3 wherein said measuring means further comprises:

first means for continuously measuring a minimum energy level of said input signal for said predetermined time period prior to receipt of a ringback signal; and, second means for cumulatively measuring a minimum energy level of said input signal for said predetermined time period subsequent to receipt at any time during said predetermined time period of a ringback signal.

6. A system according to claim 5 wherein said means for measuring the energy level of an input signal further comprises means for comparing the energy level of said input signal to a noise level, said means enabling said first means subsequent to the noise level exceeding said input signal, and said means enabling said second means subsequent to said input signal exceeding the noise level.

7. A system according to claim 3 further comprising means for reducing said predetermined threshold value subsequent to receipt of a ringback signal.

* * * * *

UNITED STATES PATENT AND TRADEMARK OFFICE
CERTIFICATE OF CORRECTION

PATENT NO. : 4,764,966

DATED : August 16, 1988

INVENTOR(S) : Mark A. Einkauf et al

It is certified that error appears in the above-identified patent and that said Letters Patent is hereby corrected as shown below:

Col. 8, line 13, delete "as signal" and insert --signal as--.

Col. 8, line 25, delete "requency" and insert --frequency--.

Signed and Sealed this

Fourth Day of February, 1992

Attest:

HARRY F. MANBECK, JR.

*Attesting Officer*    *Commissioner of Patents and Trademarks*